US012640545B2

(12) United States Patent \
Jazgar et al.

(10) Patent No.: US 12,640,545 B2 \
(45) Date of Patent: May 26, 2026

(54) SUBMARINE CONNECTION BOX FOR SUBMARINE POWER CABLES

(71) Applicant: NKT GmbH & Co. KG, Cologne (DE)

(72) Inventors: Maciej Jazgar, Leverkusen (DE); Gregor Wildermuth, Leverkusen (DE)

(73) Assignee: NKT GmbH & Co. KG, Cologne (DE)

( * ) Notice: Subject to any disclaimer, the term of this patent is extended or adjusted under 35 U.S.C. 154(b) by 288 days.

(21) Appl. No.: 18/341,179

(22) Filed: Jun. 26, 2023

(65) Prior Publication Data

US 2024/0006862 A1 Jan. 4, 2024

(30) Foreign Application Priority Data

Jun. 30, 2022 (EP) ..................................... 22182233

(51) Int. Cl.
  *H02G 3/08* (2006.01)
  *H02G 9/02* (2006.01)
  (Continued)

(52) U.S. Cl.
  CPC ............... *H02G 3/083* (2013.01); *H02G 9/02* (2013.01); *H02G 15/06* (2013.01); *H01R 13/523* (2013.01)

(58) Field of Classification Search
  CPC .......... H02G 3/083; H02G 9/02; H02G 15/06; H02G 1/10; H02G 15/117; H02G 1/14;
  (Continued)

(56) References Cited

U.S. PATENT DOCUMENTS

| | | | | |
|---|---|---|---|---|
| 2013/0286548 A1* | 10/2013 | Andrea | ..................... | H02B 7/00 |
| | | | | 361/603 |
| 2014/0055227 A1* | 2/2014 | Boe | .......................... | H01H 9/02 |
| | | | | 337/187 |
| 2020/0036170 A1* | 1/2020 | Trandal | ..................... | H02J 4/00 |

FOREIGN PATENT DOCUMENTS

| | | |
|---|---|---|
| EP | 2237380 A1 | 10/2010 |
| WO | 2020158431 A1 | 8/2020 |

OTHER PUBLICATIONS

Extended European Search Report, Application No. 22182233.1; Completed: Nov. 17, 2022; Issued: Nov. 25, 2022; 10 Pages.
(Continued)

*Primary Examiner* — Jacob R Crum \
(74) *Attorney, Agent, or Firm* — Whitmyer IP Group LLC

(57) ABSTRACT

A submarine connection box for connecting a system of submarine power cables, each including at least one submarine power cable core, the submarine connection box including: a casing, the casing having N first openings configured to receive a respective submarine power cable of a first set of N submarine power cables, N being an integer equal to or greater than 1, the casing having K second openings configured to receive a respective submarine power cable of a second set of K submarine power cables, K being an integer greater than 1, a termination box arranged inside the casing, the termination box having a housing including a first group of openings, and a second group of openings, each of the first group of openings being configured to receive a respective submarine power cable core of the first set of N submarine power cables, and each of the second group of openings being configured to receive a respective submarine power cable core of the second set of K submarine power cables, and L sets of connectors arranged in the termination box, L being an integer equal to the number of electrical phases or poles of the system of
(Continued)

submarine power cables, wherein for each of the L sets, the connectors are electrically interconnected with each other and configured to connect submarine power cable cores of corresponding electrical phases or poles of the first set of N submarine power cables and the second set of K submarine power cables.

17 Claims, 3 Drawing Sheets

(51) Int. Cl.
*H02G 15/06* (2006.01)
*H01R 13/523* (2006.01)

(58) Field of Classification Search
CPC .. H02G 15/10; H01R 13/523; H01R 13/5208; F05B 2240/95; F03D 13/25
See application file for complete search history.

(56) References Cited

OTHER PUBLICATIONS

NEXANS; "Euromold"; A Nexans Company; Retrieved from Internet: Nov. 17, 2022 ; 2 Pages.

* cited by examiner

SUBMARINE CONNECTION BOX FOR SUBMARINE POWER CABLES

TECHNICAL FIELD

The present disclosure generally relates to submarine power cable accessories.

BACKGROUND

Offshore wind farms comprise a plurality of wind turbines, typically connected by means of submarine array cables to an offshore substation from which a submarine export cable transports the power onshore.

Typically, the wind turbines are connected in a daisy-chain configuration. Thus, each array cable is suspended between adjacent wind turbine platforms.

A drawback with this configuration is that a lot of cable length is required for the connections. Further, this requires a large number of accessories such as subsea buoys, and bend stiffeners via which the array cables are attached to the wind turbine platforms.

SUMMARY

A general object of the present disclosure is to provide a submarine connection box that solves or at least mitigates the problems of the prior art.

There is hence according to a first aspect of the present disclosure provided a submarine connection box for connecting a system of submarine power cables, each comprising at least one submarine power cable core, the submarine connection box comprising: a casing, the casing having N first openings configured to receive a respective submarine power cable of a first set of N submarine power cables, N being an integer equal to or greater than 1, the casing having K second openings configured to receive a respective submarine power cable of a second set of K submarine power cables, K being an integer greater than 1, a termination box arranged inside the casing, the termination box having a housing comprising a first group of openings, and a second group of openings, each of the first group of openings being configured to receive a respective submarine power cable core of the first set of N submarine power cables, and each of the second group of openings being configured to receive a respective submarine power cable core of the second set of K submarine power cables, and L sets of connectors arranged in the termination box, L being an integer equal to the number of electrical phases or poles of the system of submarine power cables, wherein for each of the L sets, the connectors are electrically interconnected with each other and configured to connect submarine power cable cores of corresponding electrical phases or poles of the first set of N submarine power cables and the second set of K submarine power cables.

The connection box for example enables connecting one end of each of K submarine power cables, such as array cables, to the connection box and the other end of each of the K submarine power cables to a respective one of K offshore power sources such as K wind turbines. The connection box is thus used to collect power from several offshore power sources. Moreover, the connection box enables connection of at least one submarine power cable, also an array cable, that relays the power from the K submarine power cables on the seabed towards an offshore substation. Thus, the array cables of an offshore installation using the connection box will not extend in a daisy chain between the offshore power sources. Instead, up to N+K−1 array cables may be collected underwater by the connection box, which in turn may be connected to another connection box by means of an array cable extending solely on the seabed, also connected to N+K−1 or N+K−2 array cables connected to wind turbines, and so on, leading up to an offshore substation. Since the array cables would only be required to be suspended from the offshore power source to the seabed, or extend along their entire length along the seabed, instead of being led back to another offshore power source, substantial cable length may be saved. Therefore, half of the accessories may be saved too, e.g., bend stiffeners, subsea buoys, and terminations.

The first set of submarine power cables may be AC or DC submarine power cables.

The first set of submarine power cables may be medium voltage or high voltage submarine power cables.

The second set of submarine power cables may be AC or DC submarine power cables.

The second set of submarine power cables may be medium voltage or high voltage submarine power cables.

According to one embodiment N is 2, and K is 2.

N may according to some examples be greater than 2, for example 3, 4, 5 or 6.

K may according to some examples be greater than 2, for example 3, 4, 5 or 6.

According to one embodiment the connectors are T-shaped.

According to one embodiment the stem of each T-shaped connector comprises a female connector configured to receive a submarine power cable core.

According to one embodiment each female connector in the stem comprises a stress cone.

According to one embodiment each T-shaped connector comprises a cable lug extending from the stem to the arms, and a contact bolt connected to the cable lug.

According to one embodiment one of the arms of some of the T-shaped connectors comprises a male connector.

According to one embodiment one of the arms of some of the T-shaped connectors comprises a female connector connected to a male connector of one of the arms of another T-shaped connector.

According to one embodiment the N and K submarine power cables are AC power cables, and the T-shaped connectors are arranged in 3 columns, or wherein the N and K submarine power cables are DC power cables, and the T-shaped connectors are arranged in 2 columns.

Thus, if the N and K submarine power cables are three-phase AC power cables, L=3, and the three sets of electrically interconnected connectors may be arranged in 3 columns.

If the N and K submarine power cables are DC power cables, the N and K submarine power cables comprise two poles, and therefore L=2. The two sets of electrically interconnected connectors may in this case be arranged in 2 columns.

According to one embodiment each column comprises N+K T-shaped connectors.

There is according to a second aspect of the present disclosure provided a submarine power cable assembly comprising: the connection box according to the first aspect, and N+K submarine power cables, wherein N of the submarine power cables extend into the casing through a respective one of the N first openings, and K of the submarine power cables extend into the casing through a respective one of the K second openings.

According to one embodiment the N+K submarine power cables are AC power cables, wherein the T-shaped connectors of each of the 3 columns are connected to submarine power cable cores of the same electrical phase, or wherein the N+K submarine power cables are DC power cables, wherein the T-shaped connectors of each of the 2 columns are connected to submarine power cable cores that have the same polarity.

Thus, in the AC power cable case, each column represents a respective electrical phase and all connectors in a column are connected to submarine power cable cores of the corresponding electrical phase. In the DC power cable case, each column represents a respective pole and all connectors in a column are connected to submarine power cable cores of the corresponding pole or polarity.

There is according to a third aspect of the present disclosure provided an offshore wind farm comprising: a plurality of wind turbines, an offshore substation, a plurality of submarine power cable assemblies according to the second aspect, wherein for each connection box, a majority of the K+N submarine power cables connected to the connection box are connected to a respective wind turbine, and at least one of the N submarine power cables connected to the connection box is connected to another connection box, wherein one of the N submarine power cables connected to one of the connection boxes is connected to the offshore substation.

With connected in the paragraph above is meant directly connected.

According to one embodiment, for each connection box each of the submarine power cables connected to the connection box and to a wind turbine is a dynamic submarine power cable, and at least one of the N submarine power cables connected to the connection box is a static submarine power cable.

Generally, all terms used in the claims are to be interpreted according to their ordinary meaning in the technical field, unless explicitly defined otherwise herein. All references to "a/an/the element, apparatus, component, means, etc." are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
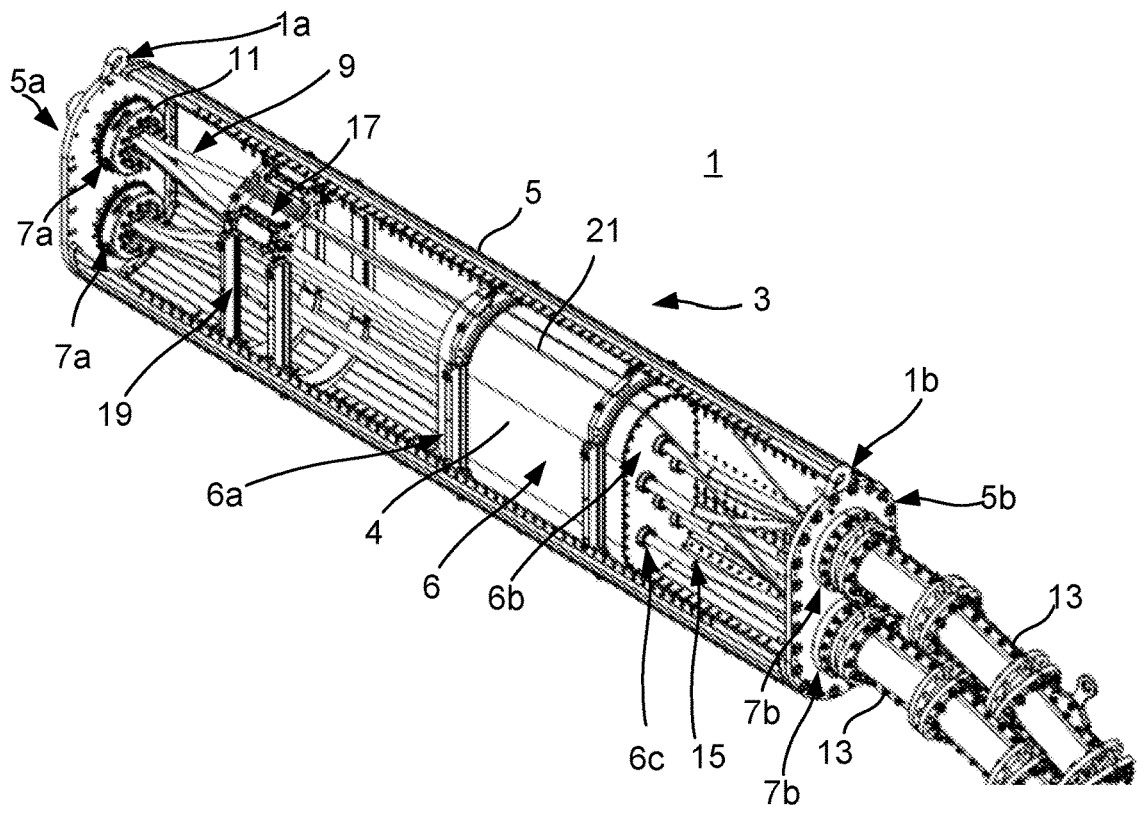
FIG. 1 schematically shows an example of a submarine power cable assembly comprising a submarine connection box with a partially removed casing.

FIG. 1 shows an example of a submarine power cable assembly 1.

The submarine power cable assembly 1 comprises a connection box 3 configured to interconnect N+K submarine power cables.

Each of the N+K submarine power cables comprises at least one submarine power cable core.

Each submarine power cable core comprises a conductor, an insulation system arranged around the conductor and a water blocking layer arranged around the insulation system. The water blocking layer may comprises a polymeric sheath and/or a metallic sheath such as a lead sheath, a copper sheath, an aluminium sheath, a stainless-steel sheath, a sheath comprising an alloy including one of the aforementioned metals, or the like.

N is an integer equal to or greater than 1. In the present example, N=2. K is an integer equal to or greater than 2. In the present example, K=2.

The submarine power cable assembly 1 comprises a first set of N submarine power cables (not shown in FIG. 1) and a second set of K submarine power cables.

The submarine connection box 3 comprises a casing 5. A portion of the casing 5 has been removed in FIG. 1 to expose the interior of the submarine connection box 3.

The exemplified casing 5 has a first face 5a and a second face 5b. The second face 5b is in the present example arranged opposite to the first face 5a.

The submarine connection box 3 comprises a termination box 6 arranged inside the casing 5. The termination box 6 has a housing 4.

The termination box 6 is according to the example arranged between the first face 5a and the second face 5b.

The first face 5a is provided with N first openings 7a. The N first openings 7a extend through the first face 5a, i.e., they are first through-openings. Each of the N first openings 7a is configured to receive a respective submarine power cable of a first set of N submarine power cables.

Each of the N first openings 7a receives a respective submarine power cable of the first set.

Each of the submarine power cables are surrounded by a respective bend restrictor (not shown). Each bend restrictor is connected to the first face 5a, for example by screws and bolts.

Inside the submarine connection box 3, the at least one submarine power cable core 9 of each of the N submarine power cable of the first set are exposed.

The N submarine power cables may be armoured. Each of the N submarine power cables may thus comprise one or more armour layers.

The one or more armour layers are attached to the submarine connection box 3. The submarine connection box 3 may comprise N clamping flanges 11 mounted to the first face 5a around a respective first opening 7a. The clamping flanges 11 may be arranged inside the casing 5 as shown in FIG. 1. Each of the N clamping flanges clamps the armour wires between itself and the first face 5a. Alternatively, the armour wires may be welded to the submarine connection box 3, for example to weld sleeves.

The second face 5*b* is provided with K second openings 7*b*. The K second openings 7*b* extend through the second face 5*b*, i.e., they are second through-openings. Each of the K second openings 7*b* is configured to receive a respective submarine power cable of a second set of K submarine power cables.

In the present example, each of the K second openings 7*b* receives a respective submarine power cable of the second set of K submarine power cables. Each of the K submarine power cables are surrounded by a respective bend restrictor 13. Each bend restrictor 13 is connected to the second face 5*b*, for example by screws and bolts.

Inside the submarine connection box 3, the at least one submarine power cable core 15 of each of the K submarine power cable of the second set are exposed.

The K submarine power cables may be armoured. Each of the K submarine power cables may thus comprise one or more armour layers.

The one or more armour layers are attached to the submarine connection box 3. The submarine connection box 3 may comprise K clamping flanges (not shown) mounted to the second face 5*b* around a respective second opening 7*b*. Each of the K clamping flanges clamps the armour wires between itself and the second face 5*b*. Alternatively, the armour wires may be welded to the submarine connection box 3, for example to weld sleeves.

The submarine power cable cores 9 of the first set of N submarine power cables are led from the N first openings 7*a* into the termination box 6. The housing 4 of the termination box 6 comprises a first group of openings (not shown), each configured to receive a respective submarine power cable core 9 of the first set of N submarine power cables. The first group of openings are through-openings.

The submarine power cable cores 15 of the second set of K submarine power cables are led from the K second openings 7*b* into the termination box 6. The housing 4 of the termination box 6 comprises a second group of openings 6*c*, each configured to receive a respective submarine power cable core 15 of the second set of K submarine power cables. The second group of openings are through-openings.

According to the example, the termination box 6 has a first box end 6*a* facing the first face 5*a*. The first box end 6*a* comprises the first group of openings, each configured to receive a respective submarine power cable core 9.

According to the example, the termination box 6 has a second box end 6*b* facing the second face 5*b*. The second box end 6*b* comprises the second group of openings, each configured to receive a respective submarine power cable core 15.

The submarine power cable cores 9 are sealed against the first box end 6*a*. For example, the termination box 6 may comprise elastic annular members arranged with a tight fit around a respective one of the submarine power cable cores 9, also sealing against the first box end 6*a*, to prevent water ingression into the termination box 6. Alternatively, a water blocking layer of each submarine power cable core 9 may be welded or soldered along its entire circumference to the termination box 6 around a respective one of the first group of openings.

The submarine power cable cores 15 are sealed against the second box end 6*b*. For example, the termination box 6 may comprise resilient annular members arranged with a tight fit around a respective one of the submarine power cable cores 15, also sealing against the second box end 6*b*, to prevent water ingression into the termination box 6. Alternatively, a water blocking layer of each submarine power cable core 15 may be welded or soldered along its entire circumference to the termination box 6 around a respective one of the second group of openings.

The termination box 6 is watertight when the submarine power cable cores 9 and 15 have been installed in the termination box 6.

The connection box 3 may comprise a fibre optic splice box 17 arranged inside the casing 5. The fibre optic splice box 17 is configured to hold spliced fibre optical cables 21 of the N and K submarine power cables, preferably in a watertight manner. The fibre optical cables 21 may extend from the first face 5*a* and the second face 5*b* to the fibre optic splice box 17. The termination box 1 may comprise an internal frame 19 to which the fibre optic splice box 17 is mounted.

The connection box 3 may comprise lifting lugs 1*a*, 1 *b*. The lifting lugs 1*a*, 1 *b* may be arranged at a top end of the casing 5. The lifting lugs 1*a*, 1 *b* may be arranged at a respective end of the casing 5. For example, a first lifting lug 1*a* may be extend from the first face 5*a*, and a second lifting lug 1*b* may extend from the second face 5*b*. The lifting lugs 1*a*, 1*b* are used for lifting the connection box 1, for example during the installation procedure.

The connection box 3 may for example have a generally cuboid shape, or it may have a triangular shape. In for example the connection box 3 has an elongated generally rectangular shape, the first face 5*a* may be a first axial end face and the second face 5*b* may be a second axial end face. In general, the connection box may have any polyhedral shape, and the first face and the second face need not be arranged opposite to each other. The first face and the second face could for example be any of the faces of a polyhedron and could even be the same face. The faces can be planar or irregular. Moreover, according to some examples, a first subset of the N first openings may be arranged in one face and a second subset of the N first openings, disjoint from the first subset, may be arranged in another face. According to some examples, a first subset of the K second openings may be arranged in one face and a second subset of the K second openings, disjoint from the first subset of K second openings, may be arranged in another face.

When the submarine power cable assembly 1 has been installed on the seabed, the casing 5 of the connection box 3 is filled with seawater.

Figure 2:
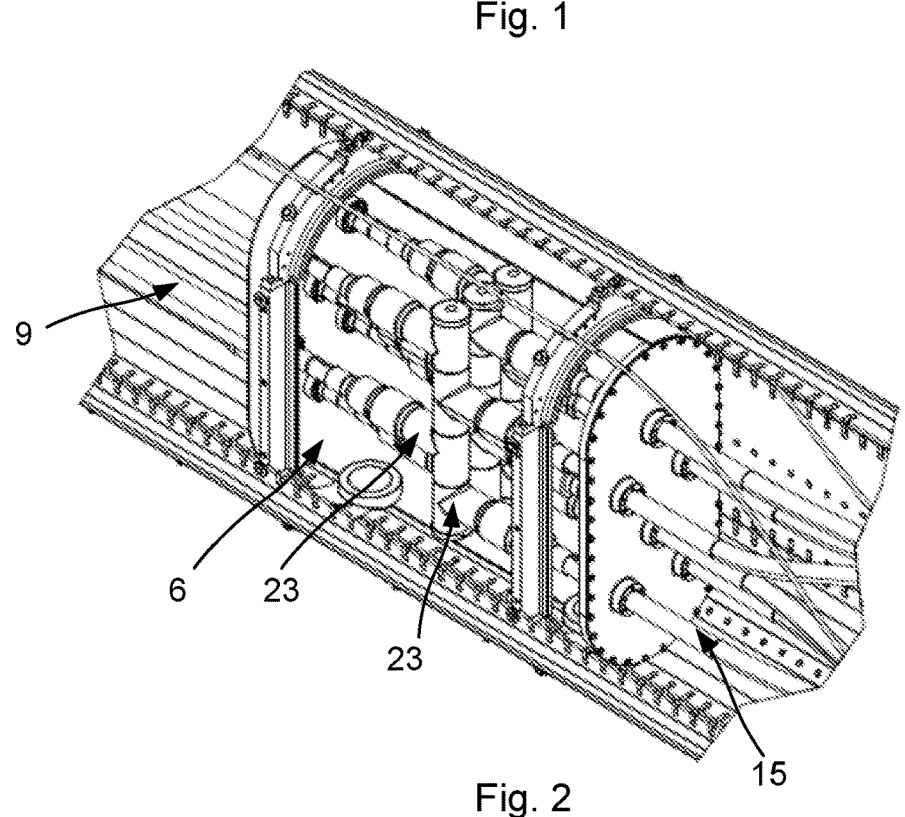
FIG. 2 shows a close-up view of a termination box inside the connection box in FIG. 1 with the housing of the termination box being partially removed to expose the interior of the termination box.

FIG. 2 shows a close-up view of the termination box 6 with its housing partially removed to expose its interior.

The termination box 6 comprises L sets of electrically interconnected connectors 23. Thus, in each of the L sets, the connectors 23 in that set are electrically interconnected with each other.

Each of the L sets of connectors 23 is configured to connect submarine power cable core(s) 9 of the first set of submarine power cables with submarine power cable cores 15 of the second set of submarine power cables. Each of the L sets of connectors 23 represents a certain electrical phase or pole. All submarine power cable cores 9 and 15 representing the same electrical phase or pole are connected to the corresponding set of connectors 23.

The connectors 23 may be arranged in 3 columns in case the system of submarine power cables is a three-phase AC power cable system. The connectors 23 in each column are electrically interconnected with each other and represent a respective one of the three sets when L=3.

If the N submarine power cables of the first set and the K submarine power cables of the second set are AC power cables, each of the columns is connected to submarine power cable cores 9, 15 that have a common electrical phase. For example, in a three-phase system, submarine power cable cores 9, 15 that are connected to a phase A are all connected to connectors forming a first column of the three columns, submarine power cable cores 9, 15 that are connected to a phase B are all connected to connectors forming a second column of the three columns, and submarine power cable cores 9, 15 that are connected to a phase C are all connected to connectors forming a third column of the three columns.

The connectors 23 may be arranged in 2 columns in case the system of submarine power cables is a DC power cable system. The connectors 23 in each column are electrically interconnected with each other and represent a respective one of the two sets when L=2.

In case the N submarine power cables of the first set and the K submarine power cables of the second set are DC power cables, each of the two columns is connected to submarine power cable cores 9, 15 that have a common polarity. For example, each submarine power cable core 9, 15 that is a positive pole is connected to connectors forming a first column of the two columns, and each submarine power cable core 9, 15 that is a negative pole is connected to connectors forming a second column of the two columns.

Each column comprises N+K interconnected connectors 23.

The connectors 23 may be T-shaped. The T-shaped connectors 23 may be of two different types, connected in an alternating manner in each column. These two types may be referred to as type 1 and type 2 T-shaped connectors.

Figures 3, 4:
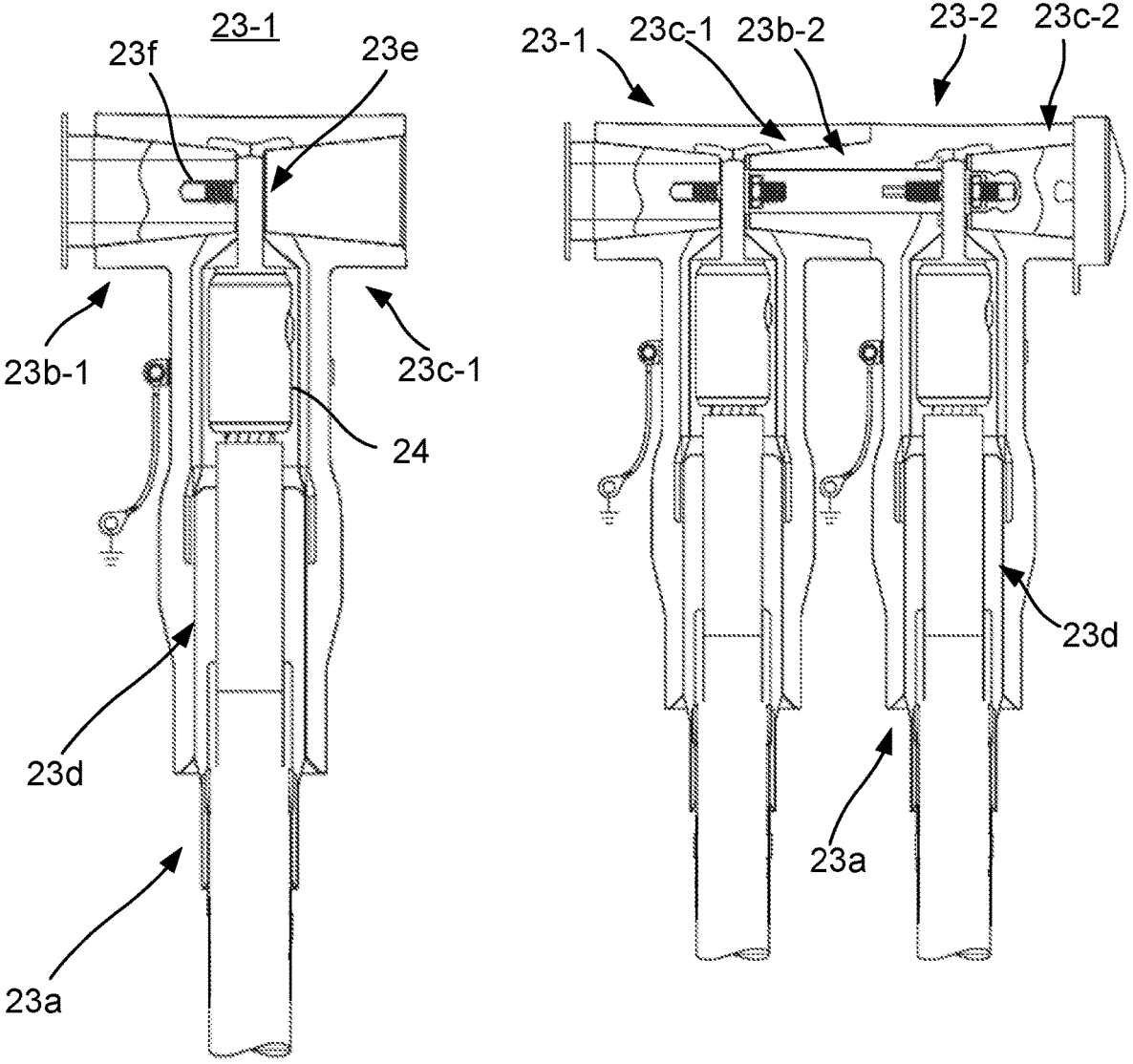
FIG. 3 shows a longitudinal section of a T-shaped connector comprising an arm with a female connector.
FIG. 4 shows a longitudinal section of two interconnected T-shaped connectors, one of them being the T-shaped connector shown in FIG. 3 and the other one being a T-shaped connector with an arm having a male connector.

An example of a type 1 T-shaped connectors 23-1 is shown FIG. 3. The T-shaped connector 23-1 shown in FIG. 3 has a stem 23a, and two arms 23b-1 and 23c-1. The stem 23a comprises a female connector configured to receive a submarine power cable core 9 or 15. Each of the arms 23b-1 and 23c-1 comprises a female connector.

The female connector in the stem 23a comprises a stress cone 23d. The stress cone 23d is configured to surround a submarine power cable core 9, where the outer semiconductive layer of the insulation system of the submarine power cable core 9, 15 has been removed to control the electric field in this region.

The T-shaped connector 23-1 comprises a cable lug 23e, including a connection piece 24 to which the end of the conductor of a submarine power cable core 9, 15 is secured mechanically and electrically.

The cable lug 23e extends from the stem 23a to the arms 23b-1, 23c-1. The T-shaped connector 23-1 also comprises a contact bolt 23f connected to the cable lug 23e. The contact bolt 23f can be used for connecting the T-shaped connector 23-1 to another T-shaped connector comprising a male connector in one of its arms.

FIG. 4 shows the T-shaped connector 23-1 connected to a T-shaped connector 23-2, which the type 2 T-shaped connector. The T-shaped connector 23-2 has a stem 23d and two arms 23b-2 and 23c-2. The arm 23b-2 comprises a male connector. This male connector may be connected to a female connector of an arm 23c-1 of a T-shaped connector 23-1, as shown in FIG. 4.

The other arm 23c-2 of the T-shaped connector 23-2 may be a female connector. This female connector may be connected to the male connector of an arm of another T-shaped connector 23-2 or it may be plugged, as in the example shown in FIG. 4.

The number of T-shaped connectors 23-1, 23-2 used in the termination box 6 depends on the integers N and K, and the number of electrical phases or poles.

Figure 5:
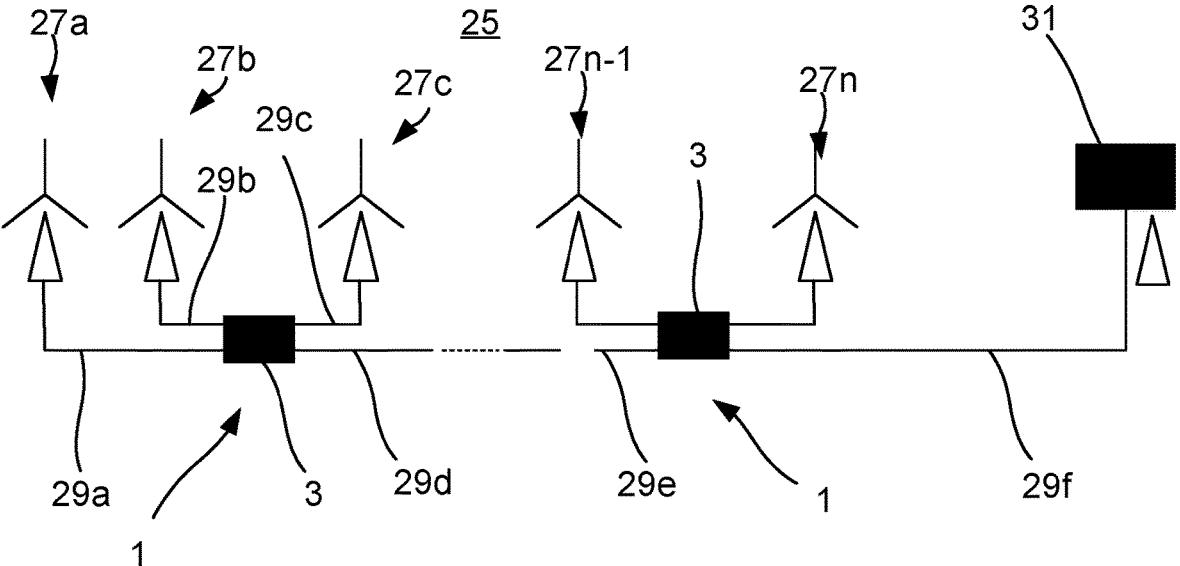
FIG. 5 schematically shows an offshore wind farm including a plurality of submarine power cable assemblies.

FIG. 5 shows an offshore wind farm 25. The offshore wind farm 25 comprises a plurality of wind turbines 27a-

27n. The wind turbines 27a-27n may be floating wind turbines or wind turbines standing on a platform installed on the seabed.

The offshore wind farm 25 comprises a plurality of submarine power cable assemblies 1.

The offshore wind farm 25 further comprises an offshore substation 31. The offshore substation 31 is connected to the wind turbines 27a-27n.

Each connection box 3 is connected to a plurality of the wind turbines 27a-27n. Further, each connection box 3 is connected to another connection box 3 by means of a submarine power cable, and one of the connection boxes 3 is connected to the offshore substation 31 by means of a submarine power cable.

In the example in FIGS. 5, N=2 and K=2. The connection box 3 to the left is connected to three wind turbines 27a-27c via a respective submarine power cable 29a-29c and to another connection box 3 via a submarine power cable 29d. Each of the submarine power cables 29a-29c is thus at one end terminated at a respective wind turbine 27a-27c, and at its other end in the termination box 6. The submarine power cable 29d is at one end terminated in the termination box 6 of the leftmost connection box 3.

The submarine power cables 29a-29c may be dynamic submarine power cables. The submarine power cable 29d may be a static submarine power cable or a dynamic submarine power cable.

The connection box 3 to the right is connected to two wind turbines 27n-1 and 27n. Further, this connection box 3 is connected to the connection box 3 to the left directly or indirectly via a submarine power cable 29e. The submarine power cable 29e is thus terminated in the termination box 6 of the rightmost connection box 3. This rightmost connection box 3 is connected to the offshore substation 31 by means of a submarine power cable 29f. The submarine power cable 29f is thus at one end terminated in the termination box 6 of the rightmost connection box 3. The submarine power cable 29f is at its other end terminated at the offshore substation 31.

If the connection boxes 3 are designed with more than four first and second openings 7a, 7b in total, additional wind turbine connections may be made.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A submarine connection box for connecting a system of submarine power cables, each including at least one submarine power cable core, the submarine connection box comprising:

a casing,

N first openings configured to receive a respective submarine power cable of a first set of N submarine power cables, N being an integer equal to or greater than 1, K second openings configured to receive a respective submarine power cable of a second set of K submarine power cables, K being an integer greater than 1, a termination box arranged inside the casing, the termination box having a housing including a first group of openings, and a second group of openings, each of the first group of openings being configured to receive a respective submarine power cable core of the first set of N submarine power cables, and each of the second group of openings being configured to receive a respective submarine power cable core of the second set of K submarine power cables, and L sets of connectors arranged in the termination box, L being an integer equal to the number of electrical phases or poles of the system of submarine power cables, wherein for each of the L sets, the connectors are electrically interconnected with each other and configured to connect submarine power cable cores of corresponding electrical phases or poles of the first set of N submarine power cables and the second set of K submarine power cables.

2. The connection box as claimed in claim 1, wherein N is 2, and K is 2.

3. The connection box as claimed in claim 1, wherein the connectors are T-shaped.

4. The connection box as claimed in claim 3, wherein a stem of each T-shaped connector includes a female connector configured to receive a submarine power cable core.

5. The connection box as claimed in claim 4, wherein each female connector in the stem includes a stress cone.

6. The connection box as claimed in claim 3, wherein each T-shaped connector comprises a cable lug extending from a stem to arms, and a contact bolt connected to the cable lug.

7. The connection box as claimed in claim 3, wherein each T-shaped connector comprises arms, and wherein one of the arms of some of the T-shaped connectors includes a male connector.

8. The connection box as claimed in claim 7, wherein one of the arms of some of the T-shaped connectors includes a female connector connected to a male connector of one of the arms of another T-shaped connector.

9. The connection box as claimed in claim 3 wherein the N and K submarine power cables are AC power cables and the T-shaped connectors are arranged in 3 columns, or wherein the N and K submarine power cables are DC power cables and the T-shaped connectors are arranged in 2 columns.

10. The connection box as claimed in claim 9, wherein each column comprises N+K T-shaped connectors.

11. A submarine power cable assembly comprising:

a connection box including:

a casing,

N first openings configured to receive a respective submarine power cable of a first set of N submarine power cables, N being an integer equal to or greater than 1, K second openings configured to receive a respective submarine power cable of a second set of K submarine power cables, K being an integer greater than 1, a termination box arranged inside the casing, the termination box having a housing including a first group of openings, and a second group of openings, each of the first group of openings being configured to receive a respective submarine power cable core of the first set of N submarine power cables, and each of the second group of openings being configured to receive a respective submarine power cable core of the second set of K submarine power cables, L sets of connectors arranged in the termination box, L being an integer equal to the number of electrical phases or poles of the system of submarine power cables, wherein for each of the L sets, the connectors are electrically interconnected with each other and configured to connect submarine power cable cores of corresponding electrical phases or poles of the first set of N submarine power cables and the second set of K submarine power cables, and N+K submarine power cables, wherein N of the submarine power cables extend into the casing through a respective one of the N first openings, and K of the submarine power cables extend into the casing through a respective one of the K second openings.

12. The submarine power cable assembly as claimed in claim 11, wherein the N and K submarine power cables are AC power cables and the T-shaped connectors are arranged in 3 columns, or wherein the N and K submarine power cables are DC power cables and the T-shaped connectors are arranged in 2 columns, wherein the N+K submarine power cables are AC power cables, wherein the T-shaped connectors of each of the 3 columns are connected to submarine power cable cores of the same electrical phase, or wherein the N+K submarine power cables are DC power cables, wherein the T-shaped connectors of each of the 2 columns are connected to submarine power cable cores that have the same polarity.

13. An offshore wind farm comprising:

a plurality of wind turbines, an offshore substation, a plurality of submarine power cable assemblies, each submarine power cable assembly having:

a connection box, which includes:

a casing,

N first openings configured to receive a respective submarine power cable of a first set of N submarine power cables, N being an integer equal to or greater than 1, K second openings configured to receive a respective submarine power cable of a second set of K submarine power cables, K being an integer greater than 1, a termination box arranged inside the casing, the termination box having a housing including a first group of openings, and a second group of openings, each of the first group of openings being configured to receive a respective submarine power cable core of the first set of N submarine power cables, and each of the second group of openings being configured to receive a respective submarine power cable core of the second set of K submarine power cables, L sets of connectors arranged in the termination box, L being an integer equal to the number of electrical phases or poles of the system of submarine power cables, wherein for each of the L sets, the connectors are electrically interconnected with each other and configured to connect submarine power cable cores of corresponding electrical phases or poles of the first set of N submarine power cables and the second set of K submarine power cables, N+K submarine power cables, wherein N of the submarine power cables extend into the casing through a respective one of the N first openings, and K of the submarine power cables extend into the casing through a respective one of the K second openings, wherein for each connection box, a majority of the K+N submarine power cables connected to the connection box are connected to a respective wind turbine, and at least one of the N submarine power cables connected to the connection box is connected to another connection box, wherein one of the N submarine power cables connected to one of the connection boxes is connected to the offshore substation.

14. The offshore wind farm as claimed in claim 13, wherein for each connection box each of the submarine power cables connected to the connection box and to a wind turbine is a dynamic submarine power cable, and at least one of the N submarine power cables connected to the connection box is a static submarine power cable.

15. The connection box as claimed in claim 2, wherein the connectors are T-shaped.

16. The connection box as claimed in claim 3, wherein each T-shaped connector comprises a stem, two arms, a cable lug extending from the stem to the arms, and a contact bolt connected to the cable lug.

17. The connection box as claimed in claim 16, wherein one of the arms of some of the T-shaped connectors includes a male connector.

* * * * *